United States Patent
Jo

(10) Patent No.: US 12,090,949 B2
(45) Date of Patent: Sep. 17, 2024

(54) METHOD OF FOLDING AIRBAG CUSHION AND AIRBAG DEVICE

(71) Applicant: HYUNDAI MOBIS CO., LTD., Seoul (KR)

(72) Inventor: Kum Ho Jo, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/347,774

(22) Filed: Jul. 6, 2023

(65) Prior Publication Data

US 2024/0217473 A1    Jul. 4, 2024

(30) Foreign Application Priority Data

Dec. 28, 2022 (KR) .......................... 10-2022-0187523

(51) Int. Cl.
*B60R 21/237*   (2006.01)
*B60R 21/2165*  (2011.01)
*B60R 21/217*   (2011.01)

(52) U.S. Cl.
CPC ........ *B60R 21/237* (2013.01); *B60R 21/2165* (2013.01); *B60R 21/217* (2013.01)

(58) Field of Classification Search
CPC .................................................... B60G 23/00
See application file for complete search history.

(56) References Cited

U.S. PATENT DOCUMENTS

| | | | | |
|---|---|---|---|---|
| 7,938,440 B2 * | 5/2011 | Kataoka | ................ | B60R 21/213 280/730.2 |
| 8,297,654 B2 * | 10/2012 | Lee | .................. | B60R 21/21656 280/743.1 |
| 8,407,968 B2 * | 4/2013 | Lachat | ................. | B60R 21/237 280/743.1 |
| 8,608,195 B2 * | 12/2013 | Yamada | ............... | B60R 21/237 280/732 |
| 8,955,875 B2 * | 2/2015 | Maita | ................ | B60R 21/23138 280/730.2 |

(Continued)

FOREIGN PATENT DOCUMENTS

| | | | | |
|---|---|---|---|---|
| CN | 111315619 A | * | 6/2020 | ......... B60R 21/2176 |
| CN | 112572339 A | * | 3/2021 | ....... B60R 21/23138 |

(Continued)

*Primary Examiner* — Nicole T Verley
(74) *Attorney, Agent, or Firm* — Novo TechIP International PLLC

(57) ABSTRACT

A method of folding an airbag cushion including a first operation of tuck-in folding an upper portion of the airbag cushion downward to form an upper tuck-in portion, and tuck-in folding a lower portion of the airbag cushion upward is to form a lower tuck-in portion, a second operation of partially in-board folding the front based on a longitudinal direction from the rear to the front of the airbag cushion, the third operation of out-board folding the airbag cushion in a state in which the airbag cushion has a partially double overlapping structure through the in-board folding, and a fourth operation of in-board folding the airbag cushion in a state in which the airbag cushion has a triple overlapping structure through the out-board folding, wherein the in-board folding and the out-board folding are alternately performed in the longitudinal direction of the airbag cushion.

8 Claims, 7 Drawing Sheets

(56) References Cited

U.S. PATENT DOCUMENTS

| | | | | |
|---|---|---|---|---|
| 9,333,932 | B2* | 5/2016 | Sakai | B60R 21/20 |
| 10,384,634 | B2* | 8/2019 | Wiscombe | B60R 21/2176 |
| 10,906,497 | B2* | 2/2021 | Madon | B60R 21/203 |
| 2009/0206585 | A1* | 8/2009 | Honda | B60R 21/23138 |
| | | | | 280/730.2 |
| 2010/0090446 | A1* | 4/2010 | Choi | B60R 21/2035 |
| | | | | 493/405 |
| 2012/0056409 | A1* | 3/2012 | Jun | B60R 21/237 |
| | | | | 280/728.1 |
| 2018/0229685 | A1* | 8/2018 | Song | B60R 21/237 |
| 2020/0307498 | A1* | 10/2020 | Nonoyama | B60R 21/237 |
| 2021/0309178 | A1* | 10/2021 | Moon | B60R 21/207 |
| 2023/0211749 | A1* | 7/2023 | Fecteau | B60R 21/232 |
| | | | | 280/741 |

FOREIGN PATENT DOCUMENTS

| | | | | | |
|---|---|---|---|---|---|
| DE | 102009030704 | A1 | * | 4/2010 | B60R 21/2035 |
| DE | 102021108522 | A1 | * | 10/2021 | B60R 21/237 |
| DE | 102015008801 | B4 | * | 6/2024 | |
| EP | 2072345 | A2 | * | 6/2009 | B60R 21/207 |
| EP | 3381752 | A1 | * | 10/2018 | B60R 21/207 |
| JP | 3918551 | B2 | * | 5/2007 | B60R 21/231 |
| JP | 7427780 | B2 | * | 2/2024 | B60R 21/207 |
| KR | 20140084977 | A | * | 7/2014 | |
| KR | 20240010352 | A | * | 1/2024 | |
| WO | WO-2017090700 | A1 | * | 6/2017 | B60R 21/207 |
| WO | WO-2019111587 | A1 | * | 6/2019 | B60R 21/205 |

* cited by examiner

I - I

METHOD OF FOLDING AIRBAG CUSHION AND AIRBAG DEVICE

CROSS-REFERENCE TO RELATED APPLICATIONS

This application claims priority to and the benefit of Korean Patent Application No. 10-2022-0187523, filed on Dec. 28, 2022, in the Korean Intellectual Property Office, the disclosure of which is incorporated herein by reference in its entirety for all purposes.

TECHNICAL FIELD

The present invention relates to a method of folding an airbag cushion and an airbag device, and more specifically, to a method of folding an airbag cushion and an airbag device in which an inflation speed of an airbag cushion is improved to improve reliability.

BACKGROUND

In general, various types of airbag devices to protect passengers from crashes are installed in vehicles. Among such airbag devices, a side airbag device is configured to inflate from a side of a passenger toward in front of a vehicle to protect the passenger when a side crash occurs.

Compared to a head-on crash, when it comes to side or lateral crashes, a distance between the passenger and a crash position is short, the crash situation for the passenger ends in a short time, and thus a fast airbag inflation speed is required. In addition, when a pressure holding time of the airbag cushion is maintained for a long time, it is advantageous for protecting the passenger.

In a conventional side airbag device, an airbag cushion folded through a roll folding method and accommodated in a housing is provided. In particular, the airbag cushion is accommodated in a roll folded state in order to avoid interference with a structure of a vehicle when the airbag cushion is inflated.

Accordingly, when the airbag cushion is inflated, it takes a long time for the roll folded airbag cushion to be unfolded, a pressure in the housing increases, and thus there may be problem that the airbag cushion is broken or the inflation of the airbag cushion is delayed.

In particular, when a material of the housing is hard, a possibility of damage to the cushion increases due to an increase in the load in the cushion. In addition, the cushion tightly rolled through a roll folding method has a structure which expands and inflates from an outer side of the cushion. Since such a structure requires a long time to expand in the cushion, in the case of the housing formed of the hard material, damage to the cushion occurs.

Therefore, needs to solve such problems are required.

SUMMARY

The present invention is directed to providing a method of folding an airbag cushion and an airbag device capable of improving an inflation speed compared to existing roll folding to prevent the airbag cushion from being damaged and to improve reliability.

Objectives of the present invention are not limited to the above-described objectives, and other problems not described above will be clearly understood by those skilled in the art from the following description.

According to an aspect of the present invention, there is provided a method of folding an airbag cushion which includes an inflator fixing member at a rear and inflates forward when expanding, the method including a first operation of tuck-in folding an upper portion of the airbag cushion downward to form an upper tuck-in portion, and tuck-in folding a lower portion of the airbag cushion upward is to form a lower tuck-in portion, a second operation of partially in-board folding the front based on a longitudinal direction from the rear to the front of the airbag cushion in a state in which the upper tuck-in portion and the lower tuck-in portion are formed, the third operation of out-board folding the airbag cushion in a state in which the airbag cushion has a partially double overlapping structure through the in-board folding, and a fourth operation of in-board folding the airbag cushion in a state in which the airbag cushion has a triple overlapping structure through the out-board folding, wherein the in-board folding and the out-board folding are alternately performed in the longitudinal direction of the airbag cushion.

In the first operation, the upper tuck-in portion and the lower tuck-in portion may be folded at least once and provided as a single or plurality of upper tuck-in portions and a single or plurality of lower tuck-in portions, respectively.

An end portion of the upper tuck-in portion and an end portion of the lower tuck-in portion may be disposed to face each other between a front panel and a rear panel of the airbag cushion.

In the second operation, the in-board folding may include dividing the airbag cushion into three equal portions in the longitudinal direction and folding ⅓ of the front rearward toward an in-board side.

In the third operation, the out-board folding may include folding the airbag cushion in half toward an out-board side.

In the fourth operation, the in-board folding may include folding the airbag cushion in half toward an in-board side.

The airbag cushion may be formed so that the inflator fixing member is disposed in a central region based on an overlapping direction after the fourth operation.

In a state in which a first bent portion formed by the in-board folding in the second operation and a second bent portion formed by the out-board folding in the third operation are disposed to face a rear of the airbag cushion, the inflator fixing member may be positioned between the first bent portion and the second bent portion.

According to another aspect of the present invention, there is provided an airbag device including a housing which is open forward, an airbag cushion accommodated in the housing in a folded state, and a cover fastened to a front of the housing to cover the airbag cushion, wherein the airbag cushion is folded in a state in which an upper tuck-in portion and a lower tuck-in portion are formed and accommodated in the housing.

The cover may include a cut groove which is cut when the airbag cushion expands so that the airbag cushion inflates.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
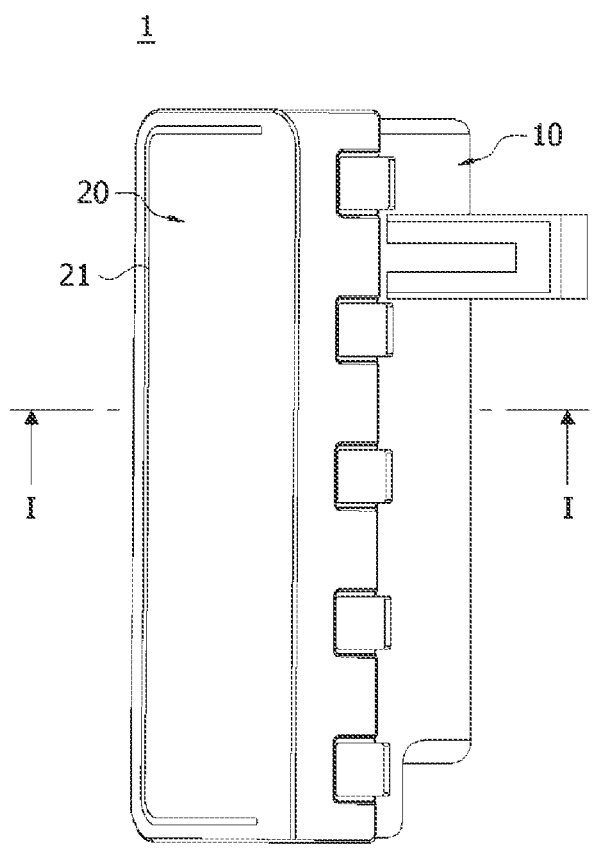
FIG. 1 is a schematic view illustrating an airbag device according to an embodiment of the present invention.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
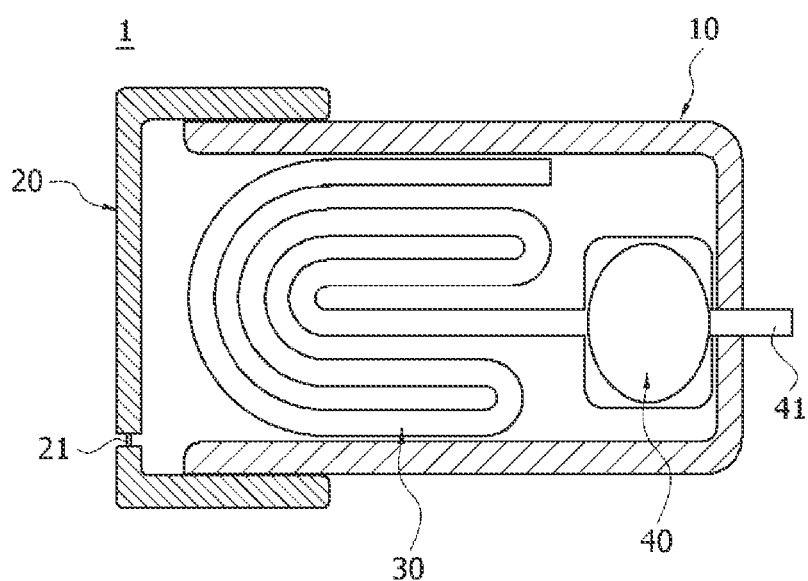
FIG. 2 is a schematic cross-sectional view illustrating the airbag device along line I-I in FIG. 1.
Figure 3:
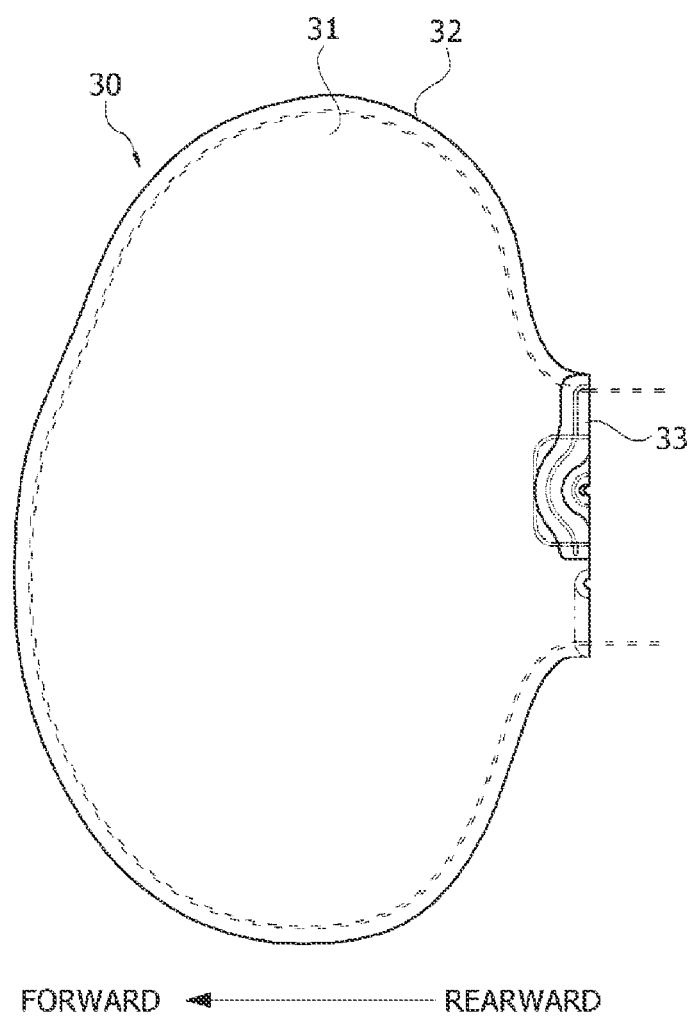
FIG. 3 is a schematic view illustrating the airbag cushion in FIG. 2.

FIG. 1 is a schematic view illustrating an airbag device according to an embodiment of the present invention, FIG. 2 is a schematic cross-sectional view illustrating the airbag device along line I-I in FIG. 1, and FIG. 3 is a schematic view illustrating the airbag cushion in FIG. 2.

An airbag device 1 according to the embodiment of the present invention may be a side airbag device and may be installed outside (at an out-board side) from a seat in which a passenger sits or in a vehicle structure provided at a side of the seat. In addition, the airbag device 1 may be inflated from a side of the passenger to protect a side surface of the passenger.

Referring to the drawings, the airbag device 1 according to the embodiment of the present invention may include a housing 10, a cover 20, and an airbag cushion 30. In addition, the airbag device 1 may further include an inflator 40 for generating gas.

The housing 10 may have a structure having a box shape which has an opening facing a forward direction and may have an accommodation space for accommodating the airbag cushion 30 therein. In this case, forward may be a direction in which the airbag cushion 30 is inflated when a vehicle crashes.

The cover 20 may be fastened to the front of the housing 10 to cover the airbag cushion 30. Specifically, the cover 20 may be mounted to cover the open front when the airbag cushion 30 is accommodated in the housing 10 in a state in which the airbag cushion 30 is folded.

In the embodiment, the cover 20 may have a cut groove 21 which is configured to tear off when the airbag cushion 30 inflates. Accordingly, the airbag cushion 30 may inflate outward while pushing the cover 20 cut along the cut groove 21.

The airbag cushion 30 may be accommodated in the housing 10 in the folded state together with the inflator 40.

The inflator 40 may generate gas according to a signal transmitted from an airbag control unit (ACU) which is not illustrated.

The inflator 40 may be formed in a substantially round bar shape. In addition, a gas generator, an ignition device, and the like may be embedded in the inflator 40.

In the embodiment, the inflator 40 may be provided as a cylindrical type having an outlet port through which the gas is discharged. In addition, the inflator 40 may include a stud 41 for installation.

The airbag cushion 30 may be accommodated in the housing 10 in the folded state. In addition, the airbag cushion 30 may expand and inflate forward from the vehicle due to the gas generated in the inflator 40.

The airbag cushion 30 includes a front panel 31 and a rear panel 32 each cut into a predetermined shape, and the front panel 31 and the rear panel 32 are bonded along edges thereof in a state of overlapping each other to form the airbag cushion.

In the embodiment, the front panel 31 and the rear panel 32 may be formed of a fabric material or synthetic fiber having flexibility.

The airbag cushion 30 may be accommodated in the housing 10 in a state in which an inflator fixing member 33 is provided at the rear of the airbag cushion 30 and the inflator 40 is mounted thereto. In addition, when expanding, the airbag cushion 30 may inflate forward.

Hereinafter, a method of folding the airbag cushion 30 according to the embodiment of the present invention will be described in detail with reference to FIGS. 4 to 7.

Figure 4:
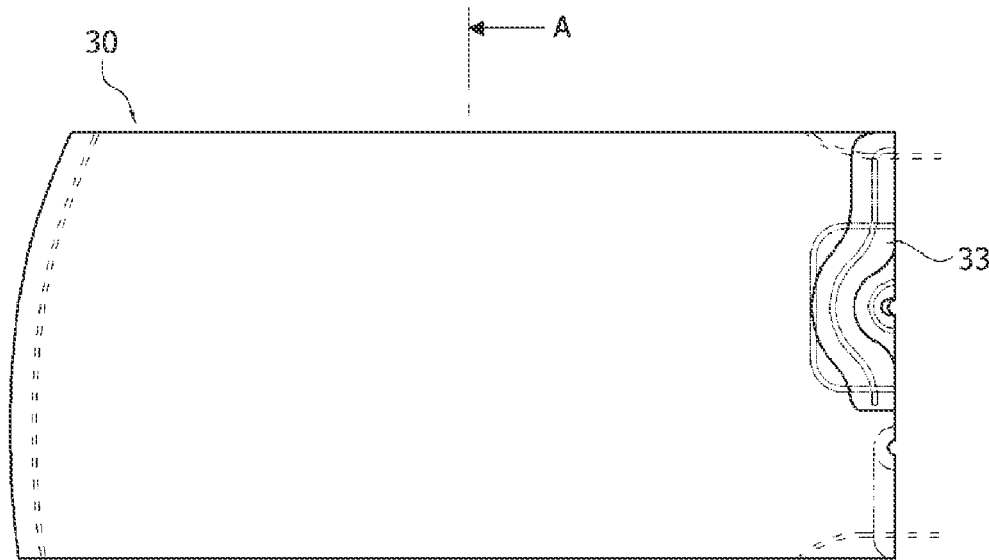
FIG. 4 is a schematic view illustrating a first operation of a method of folding the airbag cushion according to the embodiment of the present invention.
Figure 4:
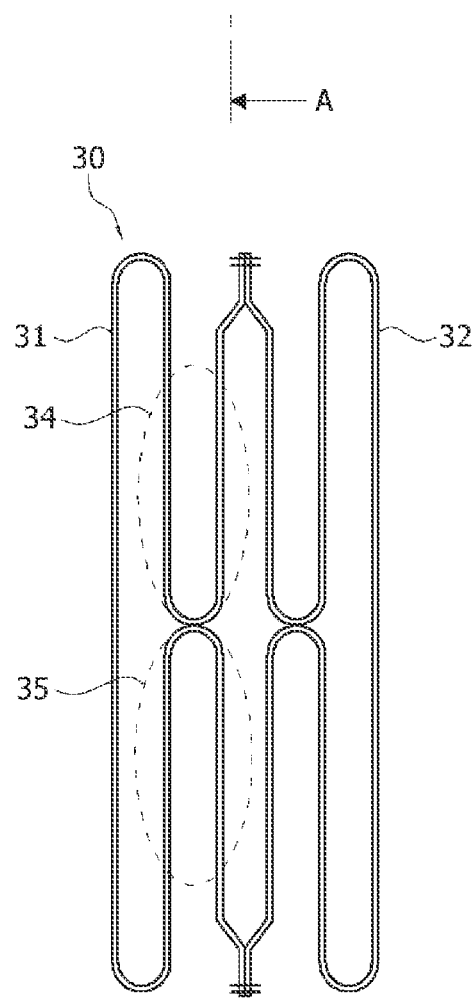
Figure 5:
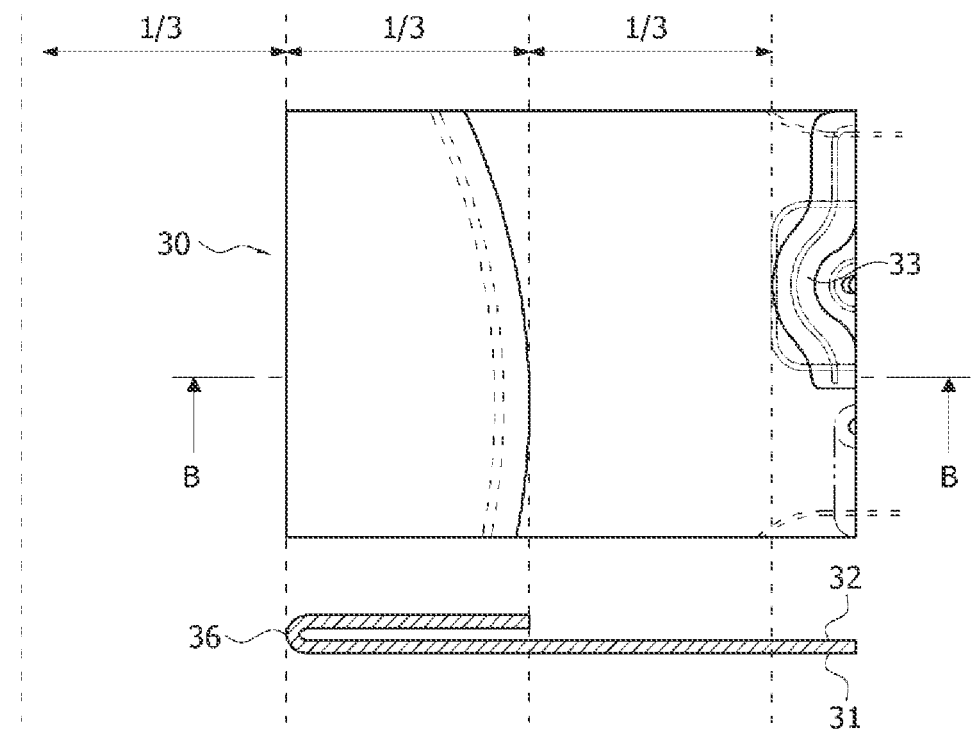
FIG. 5 is a schematic view illustrating a second operation of the method of folding the airbag cushion according to the embodiment of the present invention.
Figure 6:
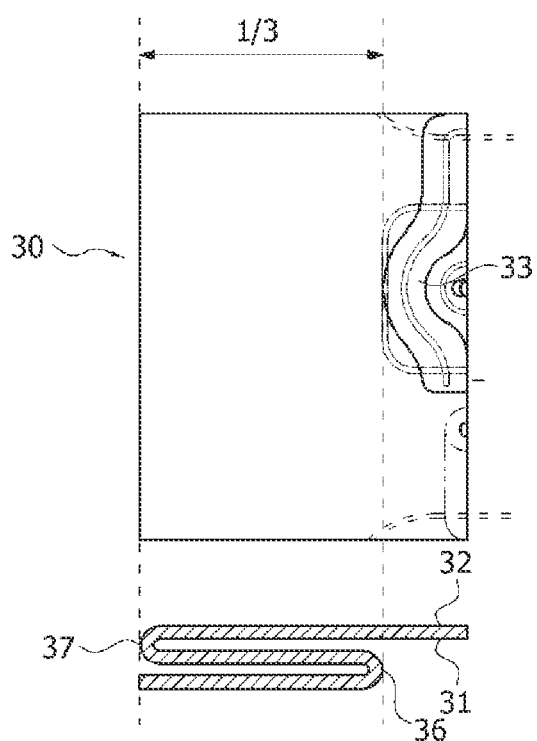
FIG. 6 is a schematic view illustrating a third operation of the method of folding the airbag cushion according to the embodiment of the present invention.
Figure 7:
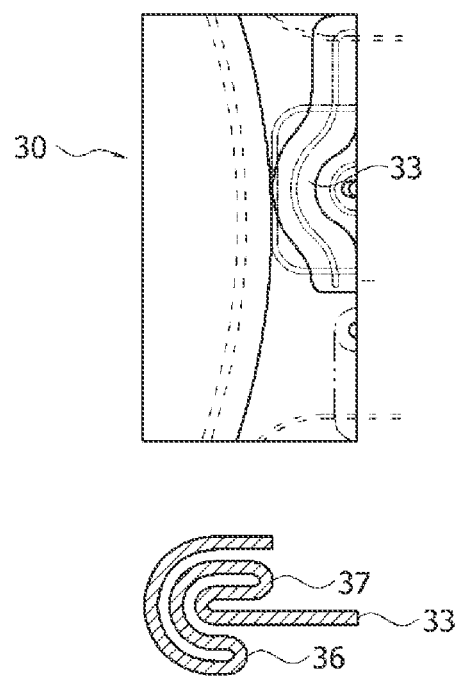
FIG. 7 is a schematic view illustrating a fourth operation of the method of folding the airbag cushion according to the embodiment of the present invention.

FIG. 4 is a schematic view illustrating a first folding operation (or simply "first operation") of the method of folding the airbag cushion according to the embodiment of the present invention, and FIG. 5 is a schematic view illustrating a second folding operation (or simply "second operation") of the method of folding the airbag cushion according to the embodiment of the present invention. FIG. 6 is a schematic view illustrating a third folding operation (or simply "third operation") of the method of folding the airbag cushion according to the embodiment of the present invention, and FIG. 7 is a schematic view illustrating a fourth folding operation (or simply "fourth operation") of the method of folding the airbag cushion according to the embodiment of the present invention.

Referring to the drawings, the method of folding the airbag cushion according to the embodiment of the present invention may include four operations, and a first operation to a fourth operation may be sequentially performed.

First, as illustrated in FIG. 4, the first operation includes tuck-in folding an upper portion of the airbag cushion 30 downward to form an upper tuck-in portion 34, and tuck-in folding a lower portion of the airbag cushion 30 upward to form a lower tuck-in portion 35.

Tuck-in folding is a folding method in which an end is folded and hidden inward by being rolled between the rear panel 32 and the front panel 31.

In the present invention, upper end portions and lower end portions are pushed inward, that is, between the front panel 31 and the rear panel 32, respectively, and folded in a state of being in contact with each other to form the upper tuck-in portion 34 and the lower tuck-in portion 35. Accordingly, an end portion of the upper tuck-in portion 34 and an end portion of the lower tuck-in portion 35 may be disposed to face each other between the front panel 31 and the rear panel 32 of the airbag cushion 30.

In the embodiment, the upper tuck-in portion 34 and the lower tuck-in portion 35 may be tuck-in folded at least once and provided as a single or plurality of upper tuck-in portion 34 and as a single or plurality of lower tuck-in portion 35, respectively. In the present embodiment, it is illustrated that the upper tuck-in portion 34 and the lower tuck-in portion 35 are tuck-in folded two times and provided as two upper tuck-in portions 34 and two lower tuck-in portions 35, but the present invention is not limited thereto.

When the number of tuck-in folding increases, there is a disadvantage that an inflation time of the airbag cushion 30 increases, and thus one or two times of tuck-in folding is suitable.

Then, as illustrated in FIG. 5, the second operation may include partially in-board folding the front in a longitudinal direction from the rear to the front of the airbag cushion 30 in a state in which the upper tuck-in portion 34 and the lower tuck-in portion 35 are formed.

Specifically, the airbag cushion 30 may be divided into three equal portions in the longitudinal direction, and one of the three equal portions at the front may be folded rearward toward an in-board side.

Accordingly, a portion of the front of the airbag cushion 30 may have a partially double overlapping structure. In addition, a first bent portion 36 facing forward may be formed by the in-board folding.

Then, as illustrated in FIG. 6, the third operation may include out-board folding the airbag cushion 30 in a state in which the airbag cushion 30 has a partially double overlapping structure through the in-board folding.

Specifically, in a state in which ⅔ of the airbag cushion 30 remains in the longitudinal direction through the second operation, half the remaining portion of the airbag cushion 30 may be folded rearward toward an out-board side.

Accordingly, the airbag cushion 30 may have a triple overlapping structure. In addition, by the out-board folding, the first bent portion 36 may be disposed to face rearward, and a second bent portion 37 facing forward may be formed.

Then, as illustrated in FIG. 7, the fourth operation may include in-board folding the airbag cushion 30 in a state in which the airbag cushion 30 has a triply overlapping structure through the out-board folding.

Specifically, in a state in which one of the three equal portions of the airbag cushion 30 remains in the longitudinal direction through the third operation, half the airbag cushion 30 may be folded rearward toward the in-board side.

Accordingly, the airbag cushion 30 may have a multiply overlapping structure. In addition, the airbag cushion 30 may be formed so that the inflator fixing member 33 is disposed in a central region based on a width direction, that is, an overlapping direction, after the fourth operation.

In other words, in a state in which the first bent portion 36 formed by the in-board folding in the second operation and the second bent portion 37 formed by the out-board folding in the third operation are disposed toward the rear of the airbag cushion 30, the inflator fixing member 33 is positioned between the first bent portion 36 and the second bent portion 37.

In the airbag cushion 30 folded as described above, the inflator 40 is mounted to the inflator fixing member 33 and accommodated in the housing 10.

As described above, in the present embodiment, the airbag cushion 30 is not folded in the conventional simple roll folding method, but the in-board folding and the out-board folding are alternately performed along the longitudinal direction of the airbag cushion 30 to form the overlapping structure in which the airbag cushion 30 is folded in a zigzag manner from the front to the rear. In this case, the inflator fixing member 33 to which the inflator 40 is mounted is positioned in the central region of the folded airbag cushion 30.

Accordingly, since a gas enters in a direction from a center of the folded airbag cushion 30 toward the front, the airbag cushion 30 may be unfolded forward in the longitudinal direction to expand and inflate. In addition, the airbag cushion 30 may push the cover 20 disposed in front of the housing 10 out and be quickly inflated externally of the housing 10 to improve an inflation speed of the airbag cushion 30. In addition, by reducing a load applied to the housing 10, the airbag cushion 30 and the housing 10 can be prevented from being damaged.

According to an embodiment of the present invention, a method of folding an airbag cushion and an airbag device capable of improving an inflation speed compared to existing roll folding to prevent the airbag cushion from being damaged and to improve reliability can be provided.

It should be noted that the effects of the present disclosure are not limited to the above-described effect, and other effects not mentioned will be clearly understood to those skilled in the art from the following descriptions.

Although the exemplary embodiments of the present disclosure have been described, it will be understood by those skilled in the art that the present disclosure may be variously modified and changed within the spirit and scope of the present disclosure described in the following patent claims. In addition, differences related to such modifications and changes should be construed as being included in the scope of the present disclosure defined in the appended claims.

What is claimed is:

1. A method of folding an airbag cushion comprising an inflator fixing member disposed at a rear of the airbag cushion and configured to expand forward when inflated, the method comprising:
    performing a first folding operation including (1) tuck-in folding an upper portion of the airbag cushion downward to form an upper tuck-in portion, and (2) tuck-in folding a lower portion of the airbag cushion upward to form a lower tuck-in portion;
    after performing the first folding operation, performing a second folding operation including partially in-board folding a front portion of the airbag cushion in a longitudinal direction from the rear to a front of the airbag cushion such that the airbag cushion has a partially double overlapping structure;
    after performing the second folding operation, preforming a third folding operation including out-board folding the airbag cushion such that the airbag cushion has a triple overlapping structure; and
    after performing the third folding operation, performing a fourth folding operation including in-board folding the airbag cushion,
    wherein the second and third folding operations are alternately performed in the longitudinal direction of the airbag cushion.

2. The method of claim 1, wherein performing the first folding operation includes tuck-in folding the upper and lower tuck-in portions once or more such that the upper and lower tuck-in portions have one or more tuck-in portions.

3. The method of claim 1, wherein an end portion of the upper tuck-in portion and an end portion of the lower tuck-in portion face each other between a front panel and a rear panel of the airbag cushion.

4. The method of claim 1, wherein performing the second folding operation includes:
    dividing the airbag cushion into three equal portions in the longitudinal direction; and
    folding one of the three equal portions at the front of the airbag cushion rearwardly toward an in-board side of the airbag cushion.

5. The method of claim 1, wherein performing the third folding operation includes folding the airbag cushion in half toward an out-board side of the airbag cushion.

6. The method of claim 1, wherein performing the fourth folding operation includes folding the airbag cushion in half toward an in-board side of the airbag cushion.

7. The method of claim 1, wherein, after the fourth folding operation is performed, the inflator fixing member is disposed in a central region of the airbag cushion.

8. The method of claim 1, wherein:
    performing the second folding operation results in forming a first bent portion facing toward the rear of the airbag cushion,
    performing the third folding operation results in forming a second bent portion facing the rear of the airbag cushion, and
    the inflator fixing member is disposed between the first and second bent portions.

* * * * *